United States Patent [19]

Davis

[11] 4,070,488

[45] Jan. 24, 1978

[54] NUTRITIVE COMPOSITION

[76] Inventor: Rachel D. Davis, 111 E. Gordon St., Kinston, N.C. 28501

[21] Appl. No.: 634,667

[22] Filed: Nov. 25, 1975

[51] Int. Cl.² ............................................. A23L 1/30
[52] U.S. Cl. ........................................ 426/72; 426/74; 426/576; 424/147; 424/280; 424/295
[58] Field of Search .......................... 426/72, 74, 576; 424/147, 280, 295

[56] References Cited

U.S. PATENT DOCUMENTS

| 2,232,699 | 2/1941 | Engels et al. | 426/72 |
| 2,481,412 | 9/1949 | Grinrod | 426/74 X |
| 2,481,414 | 9/1949 | Grindrod | 426/72 |
| 3,097,947 | 7/1963 | Kemmerer | 426/576 X |
| 3,899,598 | 8/1975 | Fischer et al. | 426/72 X |

FOREIGN PATENT DOCUMENTS

| 1,242,437 | 6/1967 | Germany | 426/72 |

Primary Examiner—Raymond N. Jones
Assistant Examiner—Esther M. Kepplinger
Attorney, Agent, or Firm—Bell, Seltzer, Park & Gibson

[57] ABSTRACT

A highly stabilized, balanced nutritive composition useful in supplementing the diet of humans and/or animals so as to insure an adequate intake of a wide range of the essential nutrients. The composition can be prepared and marketed in either liquid or dry granular form, and includes ascorbic acid, metabolically available iron, and gelatin. The gelatin has been found to stabilize the ascorbic acid in the presence of iron and other recommended nutrients, and additionally, provides a natural source for nearly all of the essential amino acids. Further, the composition may and preferably does include all of the other recommended nutrients, without adversely affecting the stabilized nature of the nutritive composition.

8 Claims, No Drawings

NUTRITIVE COMPOSITION

The present invention is directed to a nutritive composition which may include substantially all of the recognized nutrients for adequate human diet, and without deleterious effects between the various nutrients.

It has long been recognized that a high percentage of humans suffer from various nutritional deficiencies resulting from the fact that their normal diets do not include all of the various vitamins, minerals, proteins and other nutrients which are necessary to good health. Nutritionalists have now identified the essential nutrients, and in order to alleviate the problem of improper diet, it has become common practice to supplement the diet with these essential nutrients, such as by the use of vitamin pills, fortified beverages, and the like.

Of the several known vitamins, ascorbic acid (Vitamin C) is considered one of the most essential since it plays an important role in collagen formation, teeth and bone formation and repair, and the prevention of scurvy. Ascorbic acid is found naturally in many fruits and vegetables, but the vitamin is water soluble and thus is not stored in the body for any appreciable period of time. In addition, ascorbic acid is somewhat unstable, and tends to deteriorate by oxidation when stored in an aqueous solution. For these reasons, ascorbic acid is commonly included in various fortified beverages or diet supplements now being marketed so that it may be consumed on a daily basis.

Several minerals are also necessary to complete nutrition, and iron is one of the most vital of these elements. In this regard, iron is an essential part of the hemoglobin molecule, and is therefore necessary for blood transport of oxygen and carbon dioxide. Iron deficiency anemia is a recognized nutritional problem, and numerous iron fortified compositions are presently being marketed in an attempt to overcome this problem.

Proteins are highly complex substances consisting of various amino acids which are linked together. Of the several known amino acids, at least ten are generally recognized as essential to human nutrition, and since amino acids cannot be synthesized by the body, these essential amino acids must be provided by the diet.

From the foregoing, it is apparent that any nutritionally complete dietary supplement should contain ascorbic acid and iron, as well as the other recognized vitamins, minerals, and amino acids. It has been recognized for some time that the presence of iron or the other metals in a solution containing ascorbic acid acts to catalyze the deterioration of the ascorbic acid such that it is oxidized almost instantaneously. Thus, ascorbic acid fortified beverages usually do not contain iron, and known iron supplements usually do not contain ascorbic acid. As a result, many people do not consume the recommended amounts of these recognized ingredients of human nutrition.

Attempts have been made to overcome the problem of the instability of ascorbic acid in the presence of iron and one such attempt is disclosed in the patent to Hammes, U.S. Pat. No. 3,652,290. This patent discloses the use of any one of the free amino acids histidine, glycine, or methionine to stabilize the ascorbic acid. However, such use of free amino acids is not a satisfactory solution to the problem, since the selected free amino acid does not significantly contribute to the nutritional completeness of the resulting supplement. Further, the free amino acids present a problem of nutritional balance, and the cost thereof is relatively high.

It is accordingly an object of the present invention to provide a balanced, stabilized nutritive composition containing substantially all of the recognized ingredients of human nutrition combined without deleterious effect between the various ingredients.

It is a more specific object of the present invention to provide a balanced, highly stable nutritive supplement which incorporates both ascorbic acid and iron.

It is another object of the present invention to provide a nutritive supplement which may be manufactured and distributed in either solution or dry granular form, and which avoids the problems of nutritional imbalance and cost associated with the use of free amino acids.

These and other objects and advantages of the present invention are achieved in the embodiment of the invention described herein by the provision of a highly stable nutritive composition which comprises ascorbic acid, metabolically available iron, and gelatin, and which may also include the other recognized nutrients without deleterious effect on the stability of the ascorbic acid. The stability is accomplished by rendering the iron inactive in its relationship with the ascorbic acid, but yet which preserves the metabolic availability of the iron. While the mineral iron is of primary concern since it is recognized as being essential to complete nutrition, the present invention is also effective in rendering the other minerals, such as copper, inactive in the presence of ascorbic acid.

The use of gelatin in the above composition provides a further significant advantage in that the gelatin is itself a source of substantially all of the amino acids recognized as being essential to human nutrition. Thus the gelatin not only acts to stabilize the composition, but also serves to provide a balanced, inexpensive source for these essential amino acids.

The above novel composition is preferably produced by preparing an aqueous solution containing a suitable salt of iron with the ascorbic acid, together with a relatively small amount of gelatin. While the exact chemical reactions are not fully verified, it is believed that the protein molecules of the gelatin undergo a structural rearrangement and give free sulfhydryl groups (—SH) of the sulfur containing amino acids, and that these groups combine in some way to form iron containing proteins that render the iron inactive in its relationship with ascorbic acid. Similarly, when other minerals such as copper are present, the sulfhydryl groups render these minerals inactive in their relationship with ascorbic acid.

As noted above, the nutritive composition of the present invention preferably includes not only ascorbic acid and iron, but also all or at least many of the other recognized dietary essentials. In this regard, the National Research Council has published the recommended daily dietary allowances which can be expected to maintain a healthy person in good nutrition. For example, the essential ingredients and amounts as established for a normally sized woman of 25 years are as follows:

| Protein | 55 g. | Thiamine | 2.0 mg. |
|---|---|---|---|
| Vitamin A | 5000 i.u. | Pyridoxime | 2.0 mg. |
| Vitamin D | 400 i.u. | $B_{12}$ | 5.0 mg. |
| Vitamin E. | 25 i.u. | Calcium | 0.8 gm. |
| Ascorbic acid | 55 mg. | Phosphorous | 0.8 gm. |
| Folacin | .04 mg. | Iodine | 100 mg. |
| Niacin | 13 mg. | Iron | 18 mg. |

-continued

| Riboflavin | 1.0 mg. | Magnesium | 300 mg. |

In practicing the present invention, it is preferred to include about 1/10 the recommended daily allowances of these ingredients in each serving or drink. For example, in the case of a canned or bottled beverage, the various ingredients are added to the beverage so that the final concentration of each ingredient is about 10 percent of the recommended daily allowance for each drink (i.e., about 8 ounces). Where the beverage is concentrated, the dietary ingredients are added so as to achieve the 10 percent concentration when the beverage is diluted to its intended drinkable strength.

It is a further aspect of the present invention to prepare the nutritive composition in a water miscible, dry powdered or granular form suitable for use, for example, as part of a powdered drink mix, or as a flavoring to be directly applied to various foods. In such case, the composition is initially prepared in a solution as described above, and then dried and ground into a powder. Freeze drying is the preferred method of drying the solution, since evaporation by heat has been found to result in a slightly noticeable taste. In the powdered form, the stability of the various ingredients are believed to last almost indefinitely. The powder may be merchandised on prescription or as proprietary medicine in powder form in order that people with marked nutritional deficiencies may add it to the food in quantities recommended by physicians and dietary departments of institutions.

The process of the present invention is preferably carried out by initially heating and bringing to a boil an aqueous gelatin solution having a concentration of at least about 0.1% gelatin. Somewhat higher concentrations can be employed, without noticeable change in its stablizing effect. Concentrations of greater than about 0.4% are usually unsatisfactory, since the solution tends to gel upon cooling.

After reaching the boil, the metabolically available iron is added. The solution is then allowed to cool, and the ascorbic acid and the other desired ingredients are added. As noted above, the amount of each ingredient added is determined by the desired concentration in the final product, which typically is about 10 percent of the recommended daily allowance for each drink or serving. The resulting solution may then be added directly to a natural or manufactured beverage, which is then enclosed in a sealed can or other container in the conventional manner.

Where a powdered form is desired, the above solution is freeze dried, and then ground into a fine powder having a consistency and appearance similar to household sugar.

The following are specific examples which exemplify the present invention:

EXAMPLE I

A 0.1% gelatin (Knox) solution was prepared and divided into two portions. One portion was boiled for twenty minutes, while the other portion was not heated. The non-heated portion was further divided into samples 1-4 as listed below in Table I, and the heated portion was divided into samples 5-8. Ascorbic acid (1-ascorbic acid, Nutritional Biochemical Corporation, Cleveland, Ohio) was added to each of the eight samples so as to have an initial concentration of 20.0 mg per 100 ml of the solution. Copper (cupric sulfate) was added to samples 2, 3, 6 and 7 at a concentration of 1 ppm, and iron (ferrous sulfate) was added to samples 2, 4, 6 and 8 at a concentration of 4 mg per 100 ml. In the heated samples, the solution was allowed to cool before the ascorbic acid was added, but the copper and iron were added while the solution was hot.

The ascorbic acid content was determined fluorometrically after 0, 2, 7 and 14 days. The samples were stored in closed containers at 4° C through the duration of the study, and care was taken to prevent exposure to direct light. Table I below sets forth the results obtained, with the concentration of the ascorbic acid depressed in mg per 100 ml.

TABLE I

| Sample No. | Days | | | |
|---|---|---|---|---|
| | 0 | 2 | 7 | 14 |
| 1 | 22.5 | 21.9 | 21.9 | 19.4 |
| 2 | 19.0 | 18.2 | 14.1 | 10.1 |
| 3 | 19.1 | 17.8 | 14.8 | 11.1 |
| 4 | 18.9 | 18.4 | 16.7 | 12.8 |
| 5 | 19.4 | 19.7 | 19.2 | 18.0 |
| 6 | 19.0 | 18.7 | 15.5 | 10.2 |
| 7 | 19.4 | 19.6 | 14.3 | 10.8 |
| 8 | 20.7 | 19.9 | 18.1 | 13.9 |

EXAMPLE II

Eight samples were prepared as described above, with the only variation being that a 0.3% gelatin (Knox) solution was employed. The ascorbic acid content was measured after 0, 3, and 10 days with the following results.

TABLE II

| Sample No. | Days | | |
|---|---|---|---|
| | 0 | 3 | 10 |
| 1 | 18.8 | 18.3 | 17.2 |
| 2 | 18.3 | 15.4 | 11.0 |
| 3 | 18.2 | 15.9 | 9.5 |
| 4 | 17.5 | 16.6 | 12.4 |
| 5 | 20.3 | 19.9 | 17.3 |
| 6 | 19.2 | 17.0 | 12.4 |
| 7 | 18.9 | 16.3 | 12.8 |
| 8 | 19.3 | 18.3 | 21.6 |

From the above description, it will be seen that the present invention provides a highly efficient process for producing a nutritially complete food supplement, and which combines complete nutrition with the stabilization of ascorbic acid in the presence of iron and the other minerals, such as copper. Further, the stabilization is accomplished through the use of gelatin, which additionally provides a natural source for substantially all of the amino acids which are recognized as being essential for complete nutrition. Thus the problem of nutritional imbalance associated with the use of free amino acids is avoided.

Gelatin, as the term is used herein, includes any of the gelatins commonly employed in the food industry, including those in the preparation of gelatin dessert. Such a gelatin commonly has a Bloom of 100-285, typically 200.

In the foregoing specification, there has been set forth a preferred embodiment of the invention, and although specific terms are employed, they are used in a generic and descriptive sense only and not for purposes of limitation.

That which is claimed is:

1. A highly stable aqueous solution useful as a nutritive supplement or nutritive composition and comprising water, ascorbic acid and metabolically available iron in quantities suitable for supplementing the human diet and materially assisting in assuring the intake of the recommended daily allowances thereof, and gelatin in such quantity as to effectively retard the deterioration of the ascorbic acid in the presence of the iron and without gelling the solution.

2. The aqueous solution as defined in claim 1 wherein the concentration of the gelatin with respect to the water is less than about 0.4%.

3. The aqueous solution as defined in claim 1 wherein the concentration of the gelatin with respect to the water is between about 0.1% to 0.4%.

4. A highly stable aqueous solution useful as a nutritive supplement or nutritive composition and characterized by substantial stability of the various ingredients in the presence of each other, and comprising water, ascorbic acid, metabolically available iron, gelatin, and other vitamins, minerals or other ingredients not subversive of the above characteristics, with the ascorbic acid and iron being present in such quantities as are suitable for supplementing the human diet and materially assisting in assuring the intake of the recommended daily allowances thereof, and with the gelatin being present in such quantity as to effectively retard the deterioration of the ascorbic acid and without gelling the solution.

5. The method of preparing a highly stable nutritive composition comprising the steps of preparing an aqueous solution comprising water, gelatin, and metabolically available iron, and then adding ascorbic acid to the solution, with the iron and ascorbic acid being present in such quantities as are suitable for supplementing the human diet and materially assisting in assuring the intake of the recommended daily allowances thereof, and the gelatin being present in such quantity to effectively retard the deterioration of the ascorbic acid in the presence of the iron and without gelling the solution.

6. The method as defined in claim 5 wherein the step of preparing an aqueous solution includes heating a solution which comprises water and gelatin, and then adding the metabolically available iron to the heated solution.

7. The method of preparing a highly stable nutritive composition in a water miscible dry form, and suitable for mixing in a conventional beverage or adding to other food products, comprising the steps of preparing an aqueous solution comprising ascorbic acid, metabolically available iron, and gelatin, with the ascorbic acid and iron being present in such quantities as are suitable for supplementing the human diet and materially assisting in assuring the intake of the recommended daily allowances thereof, and with the gelatin being present in such quantity as to effectively retard the deterioration of the ascorbic acid in the presence of the iron and without gelling the solution, and then drying the solution to produce a dryed product.

8. The method as defined in claim 7 wherein the drying step is carried out in the absence of heat.

* * * * *